United States Patent
Kadota

(10) Patent No.: US 9,176,697 B2
(45) Date of Patent: Nov. 3, 2015

(54) COMMUNICATION APPARATUS, CONTROL METHOD THEREFOR, AND COMPUTER-READABLE STORAGE MEDIUM

(71) Applicant: CANON KABUSHIKI KAISHA, Tokyo (JP)

(72) Inventor: Eiji Kadota, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/308,227

(22) Filed: Jun. 18, 2014

(65) Prior Publication Data

US 2015/0002891 A1 Jan. 1, 2015

(30) Foreign Application Priority Data

Jun. 28, 2013 (JP) ................. 2013-137481

(51) Int. Cl.
 *G06F 3/12* (2006.01)
(52) U.S. Cl.
 CPC ............ *G06F 3/1292* (2013.01); *G06F 3/1203* (2013.01); *G06F 3/1268* (2013.01)

(58) Field of Classification Search
 USPC ......................................... 358/1.15
 See application file for complete search history.

(56) References Cited

U.S. PATENT DOCUMENTS

| | | | |
|---|---|---|---|
| 2013/0229673 A1* | 9/2013 | Nakayama et al. | 358/1.13 |
| 2013/0229683 A1* | 9/2013 | Nakayama | 358/1.15 |

FOREIGN PATENT DOCUMENTS

JP  2010-006016 A  1/2010

\* cited by examiner

*Primary Examiner* — Ngon Nguyen
(74) *Attorney, Agent, or Firm* — Fitzpatrick, Cella, Harper & Scinto

(57) ABSTRACT

A job for executing predetermined processing is received from an external apparatus. When the job is received, the predetermined processing is executed. A setting value to be used to execute the predetermined processing is stored in a memory from which an external apparatus can read out the setting value even if no power is supplied to a communication apparatus.

18 Claims, 12 Drawing Sheets

F I G. 8

| |
|---|
| PAPER SIZE |
| MARGIN (SPACE) |
| PAPER TYPE |
| DOUBLE-SIDED SETTING (SHORT SIDE/LONG SIDE/ETC.) |
| QUALITY |
| . . . |
| . . . |

F I G. 9

| IMAGE ID | REMAINING PRINTING COUNT |
|---|---|
| 1 | 10 |
| 2 | 5 |
| 3 | 4 |
| 4 | 3 |
| 5 | 20 |
| . . . | . . . |

FIG. 13

| | VER. 1.000 (PRINTING APPARATUS 300) | VER. 2.000 (PRINTING APPARATUS 700) |
|---|---|---|
| PAPER SIZE | 1 (A4) | 2 (A4) |
| MARGIN (SPACE) | 1 (PRESENT) | 3 (PRESENT) |
| PAPER TYPE | 1 (PLAIN PAPER) | 2 (PLAIN PAPER) |
| DOUBLE-SIDED SETTING (SHORT SIDE/LONG SIDE/ETC.) | 1 (SHORT-SIDE BINDING) | 1 (SHORT-SIDE BINDING) |
| QUALITY | 1 (STANDARD) | 3 (STANDARD) |
| ... | ... | ... | ent. That is, a communication apparatus including a nonvolatile memory, comprising: a reception unit configured to receive a job for executing predetermined processing from an external apparatus; an execution unit configured to execute the predetermined processing in a case where the reception unit receives the job; and a storage control unit configured to store a setting value to be used to execute the predetermined
COMMUNICATION APPARATUS, CONTROL METHOD THEREFOR, AND COMPUTER-READABLE STORAGE MEDIUM

BACKGROUND OF THE INVENTION

1. Field of the Invention

The present invention relates to a communication apparatus and a communication system and, more specifically, to a communication technique capable of performing short distance wireless communication.

2. Description of the Related Art

In recent years, there is known a system in which an external apparatus such as a digital camera or mobile phone specifies a communication partner by short distance wireless communication represented by NFC, and an image forming apparatus such as a printer outputs an image file by wireless communication different from short distance wireless communication.

Since the external apparatus disconnects communication upon completion of transfer of an image file, even if an error occurs in the image forming apparatus after completion of transfer of the image file, the external apparatus is never notified of contents of the error. It is, therefore, difficult for the user of the external apparatus to recognize what kind of error has occurred, and an operation required for dealing with the error. To solve such problem, there has been proposed a method of notifying an external apparatus of information about an error which has occurred, at the time of reconnection after disconnection of wireless communication (Japanese Patent Laid-Open No. 2010-6016).

In, however, an arrangement described in Japanese Patent Laid-Open No. 2010-6016 in which an external apparatus is notified of error information, when a printer in which an error has occurred cannot continue printing and another printer attempts to continue printing, it is necessary to manually re-input job information. Furthermore, when the external apparatus instructs a printer to perform printing, a job may be generated using settings within the printer, that is, default settings as setting values such as a paper size, paper type, and quality. When an error occurs while printing a job generated using the default settings, and the printing operation is interrupted, the external apparatus may not be able to recognize the settings of the job executed by the printer since the settings have been decided within the printer. Consequently, the external apparatus may not be able to regenerate a print job using the settings of the interrupted printing operation. Therefore, it is difficult for another printer to continue the printing operation.

SUMMARY OF THE INVENTION

The present invention provides a communication technique in which even if no power is supplied to a communication apparatus, an external apparatus can read out setting values to be used to execute predetermined processing in the communication apparatus.

To achieve the above object, a communication apparatus according to the present invention has the following arrangement. That is, a communication apparatus including a nonvolatile memory, comprising: a reception unit configured to receive a job for executing predetermined processing from an external apparatus; an execution unit configured to execute the predetermined processing in a case where the reception unit receives the job; and a storage control unit configured to store a setting value to be used to execute the predetermined processing by the execution unit in the nonvolatile memory from which the external apparatus is capable of reading out the setting value even if no power is supplied to the communication apparatus.

According to the present invention, even if no power is supplied to a communication apparatus, an external apparatus can read out setting values to be used to execute predetermined processing in the communication apparatus.

Further features of the present invention will become apparent from the following description of exemplary embodiments with reference to the attached drawings.

BRIEF DESCRIPTION OF THE DRAWINGS

FIG. 8 is a table showing setting values of a job saved in the NFC memory of the printing apparatus;

FIG. 9 is a table showing a remaining printing count saved in the NFC memory of the printing apparatus;

FIG. 13 is a table for explaining differences in job setting values between firmware versions.

DESCRIPTION OF THE EMBODIMENTS

Embodiments of the present invention will be exemplarily described in detail below with reference to the accompanying drawings. Note that the relative arrangement of components, display screens, and the like set forth in the embodiments do not intend to limit the scope of the invention to them, unless otherwise specified.

First Embodiment

Figure 1:
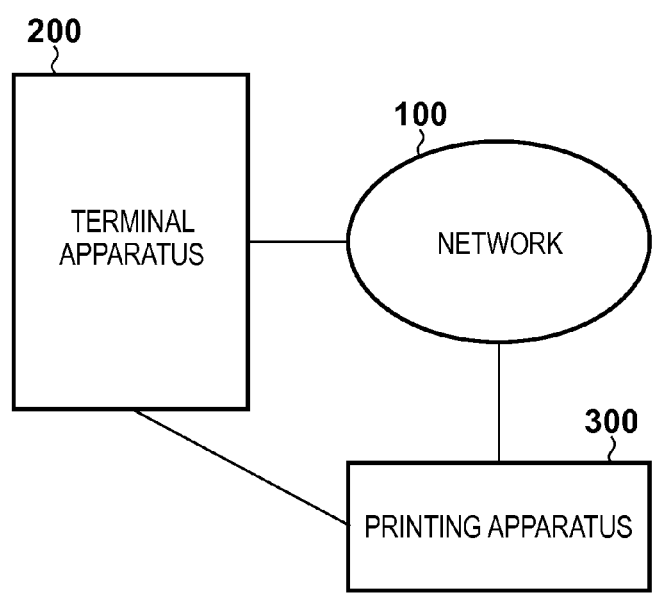
FIG. 1 is a view showing the configuration of a printing system.

FIG. 1 is a view showing the configuration of a printing system.

A terminal apparatus 200 and a printing apparatus 300 are connected as external apparatuses by using a network 100 as the center. The terminal apparatus 200 which also functions as a communication apparatus has at least two types of wireless communication portions whose communication speeds are different from each other. The terminal apparatus 200 may be any apparatus which can process a file to be printed, for example, a personal information terminal such as a PDA (Personal Digital Assistant), a mobile phone, or a digital camera.

The printing apparatus 300 which also functions as a communication apparatus has a scanning function of scanning a document placed on a document table, and a printing function of performing printing using a print engine such as an inkjet printer, and may additionally have a FAX function and telephone function.

The network 100 and printing apparatus 300 are connected via a wired LAN or wireless LAN. The network 100 and terminal apparatus 200 are connected via a wireless LAN. Since both the terminal apparatus 200 and the printing apparatus 300 have a wireless LAN function, they can perform peer-to-peer (to be referred to as P2P hereinafter) communication by executing mutual authentication.

Figure 2:
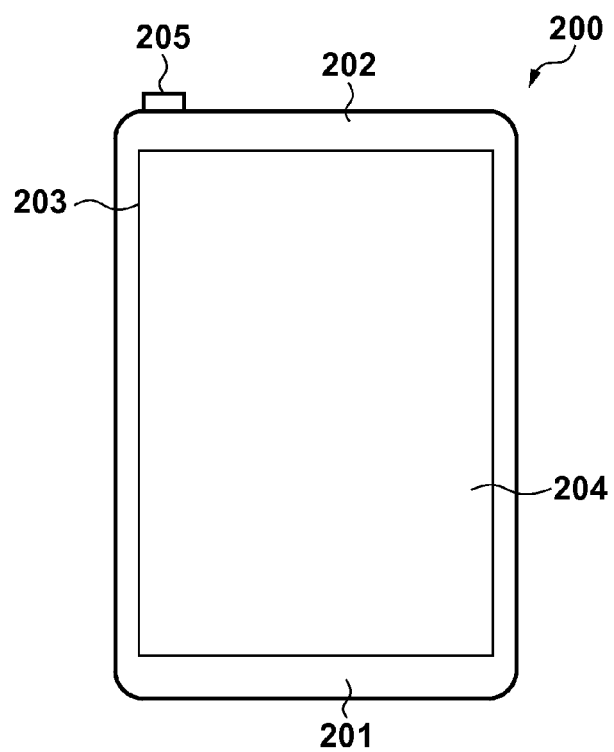
FIG. 2 is a view showing the outer appearance of a terminal apparatus.

FIG. 2 is a view showing the outer appearance of the terminal apparatus 200.

In this embodiment, a smartphone will be exemplified. The smartphone indicates a multi-function mobile phone which incorporates a camera, network browser, email function, and the like in addition to functions of a mobile phone. An NFC portion 201 is a portion for performing communication using NFC. They can communicate with each other when the NFC portion 201 is actually moved closer to a partner NFC portion within a predetermined distance (about 10 cm).

A wireless LAN portion 202 is a portion used to perform communication via a wireless LAN, and is arranged within the terminal apparatus 200. A display portion 203 is, for example, a display having an LCD display mechanism. An operation portion 204 includes a touch-panel operation mechanism, and detects pressing information of the user. As a representative operation method, the display portion 203 displays button icons and a software keyboard, and the user presses the operation portion 204, thus issuing a button pressing event. A power key 205 is used to turn on/off the power.

Figure 3A:
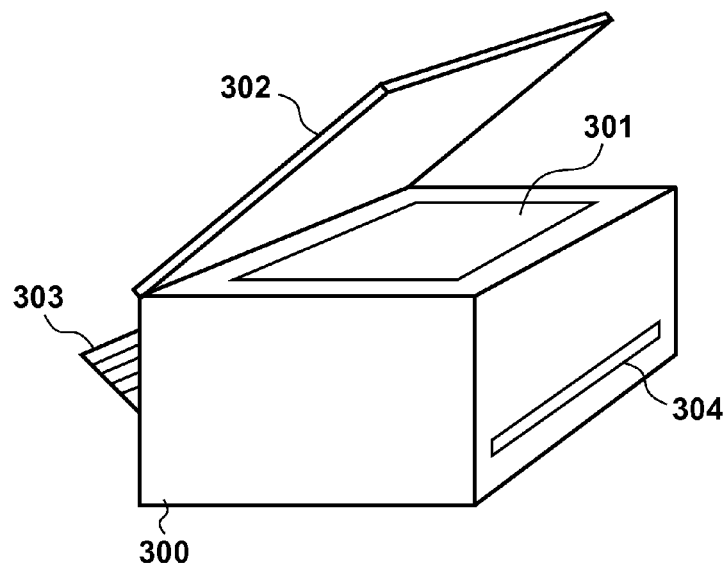
FIG. 3A is a view showing the outer appearance of a printing apparatus.
Figure 3B:
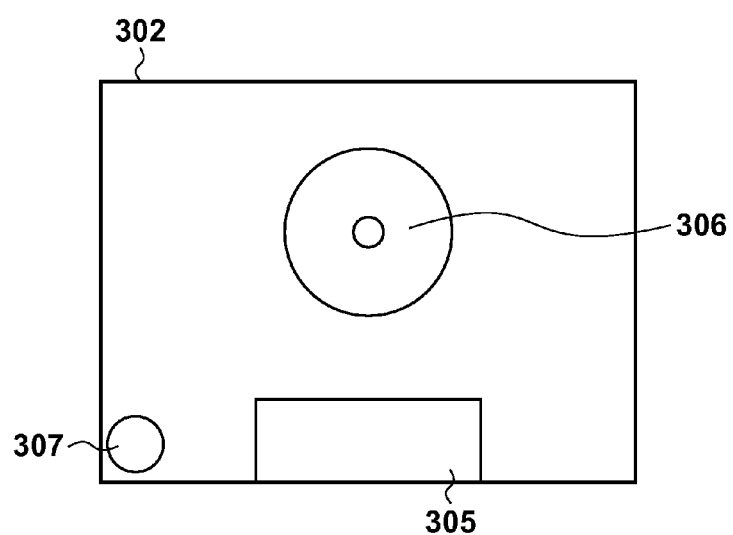
FIG. 3B is a view showing the upper portion of the printing apparatus.

FIG. 3A is a view showing the outer appearance of the printing apparatus. FIG. 3B is a view showing the upper portion of the printing apparatus.

In this embodiment, an MFP (Multi Function Printer) having a scanning function (scanner) will be exemplified. Referring to FIG. 3A, a document table 301 is a glass-like transparent table which is used to scan a document placed on it by the scanner. A document cover 302 is a cover used to prevent scanning light from externally leaking at the time of scanning by the scanner. A printing paper insertion port 303 is an insertion port on which paper sheets of various sizes are set. Paper sheets set on the printing paper insertion port 303 are conveyed one by one to a printing portion, and are discharged from a printing paper discharge port 304 after printing is performed.

Referring to FIG. 3B, an operation and display portion 305 and an NFC portion 306 are arranged on the upper portion of the document cover 302. The NFC portion 306 is a portion used to perform short distance wireless communication, and is a place where the terminal apparatus 200 is actually moved closer to the printing apparatus 300. A predetermined distance (about 10 cm) from the NFC portion 306 is an effective distance of contact. A wireless LAN antenna 307 is an antenna which is used to perform wireless LAN communication, and is embedded in the MFP.

Note that short distance wireless communication indicates wireless communication whose communication range is a relatively narrow predetermined range (for example, 1 m to several cm), which is represented by NFC.

Figure 4:
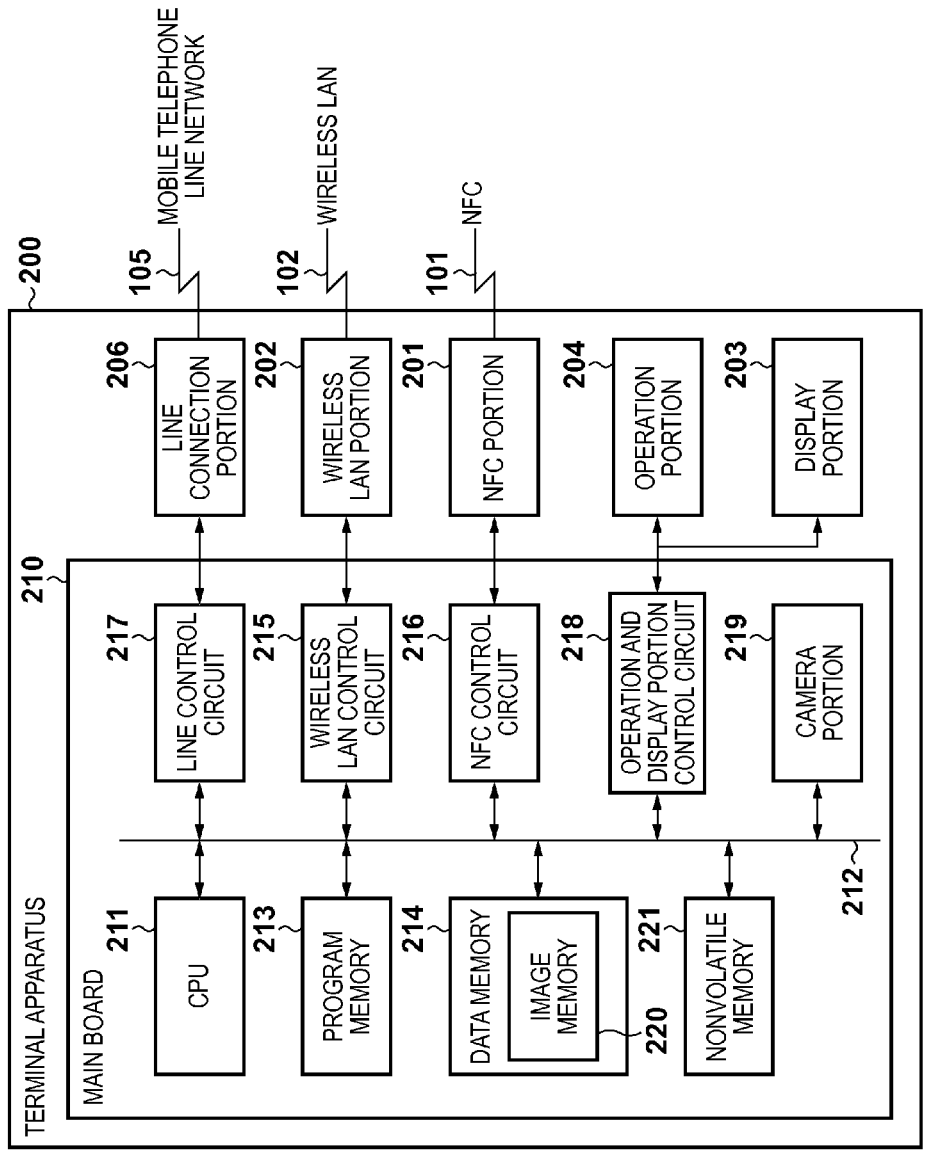
FIG. 4 is a block diagram showing the arrangement of the terminal apparatus.

FIG. 4 is a block diagram showing the arrangement of the terminal apparatus.

The terminal apparatus 200 includes a main board 210 for controlling the overall apparatus, the wireless LAN portion 202, the NFC portion 201, a line connection portion 206, the operation portion 204, and the display portion 203. Note that each of the wireless LAN portion 202, NFC portion 201, line connection portion 206 functions as a communication portion of the terminal apparatus 200.

A CPU 211 in the form of a microprocessor arranged in the main board 210 operates according to control programs stored in a program memory 213 in the form of a ROM connected via an internal bus 212, and contents in a data memory 214 in the form of a RAM.

By controlling the wireless LAN portion 202 via a wireless LAN control circuit 215, the CPU 211 communicates with another communication terminal apparatus via a wireless LAN 102. By controlling the NFC portion 201 via an NFC control circuit 216, the CPU 211 can detect a connection with another NFC terminal via NFC 101, and transmit/receive data to/from the other NFC terminal. By controlling the line connection portion 206 via a line control circuit 217, the CPU 211 can connect to a mobile telephone line network 105, and make a call or transmit/receive data.

By controlling an operation and display portion control circuit 218, the CPU 211 can display data on the operation portion 204, and accept an operation from the user. The CPU 211 can capture an image by controlling a camera portion 219, and store the captured image in an image memory 220 of the data memory 214. In addition to the captured image, it is possible to store, in the image memory 220, an image obtained from the outside via the mobile telephone line network 105, wireless LAN 102, or NFC 101, and also transmit an image to the outside.

A nonvolatile memory 221 is implemented by a memory such as a flash memory, and stores data to be saved even after power-off. The nonvolatile memory 221 stores, for example, image data to be saved, and programs such as application software programs for implementing various functions of the terminal apparatus 200, in addition to address book data, various kinds of communication connection information, previously connected device information, and the like.

Figure 5:
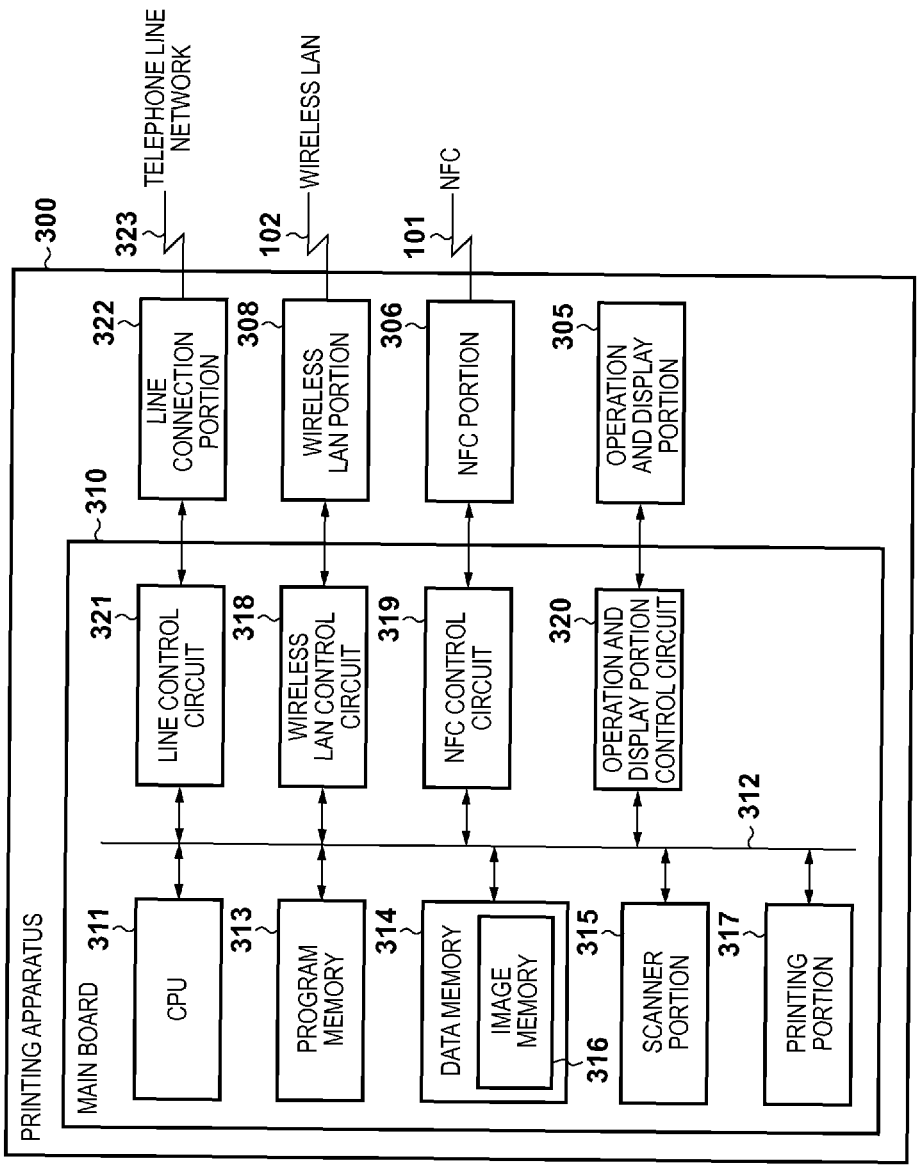
FIG. 5 is a block diagram showing the arrangement of the printing apparatus.

FIG. 5 is a block diagram showing the arrangement of the printing apparatus.

The printing apparatus 300 includes a main board 310 for controlling the overall apparatus, a line connection portion 322, a wireless LAN unit 308, the NFC unit 306, and the operation and display portion 305. Note that each of the line connection portion 322, wireless LAN portion 308, and NFC portion 306 functions as a communication portion of the printing apparatus 300.

A CPU 311 in the form of a microprocessor arranged in the main board 310 operates according to control programs stored in a program memory 313 in the form of a ROM connected via an internal bus 312, and contents in a data memory 314 in the form of a RAM.

The CPU 311 controls a scanner portion 315 to scan a document, and stores data in an image memory 316 of the data memory 314. The CPU 311 can control a printing portion 317 to print an image in the image memory 316 of the data memory 314 on a printing medium.

By controlling the wireless LAN portion 308 via a wireless LAN control circuit 318, the CPU 311 communicates with another communication terminal apparatus via the wireless LAN 102. By controlling the NFC portion 306 via an NFC control circuit 319, the CPU 311 can detect a connection with another NFC terminal via the NFC 101, and transmit/receive data to/from the other NFC terminal. By controlling the line connection portion 322 via a line control circuit 321, the CPU 311 can connect to a telephone line network 323, and perform FAX transmission/reception or data transmission/reception.

By controlling an operation and display portion control circuit 320, the CPU 311 can display the state of the printing apparatus 300 or a function selection menu on the operation and display portion 305, and accept an operation from the user.

Figure 6:
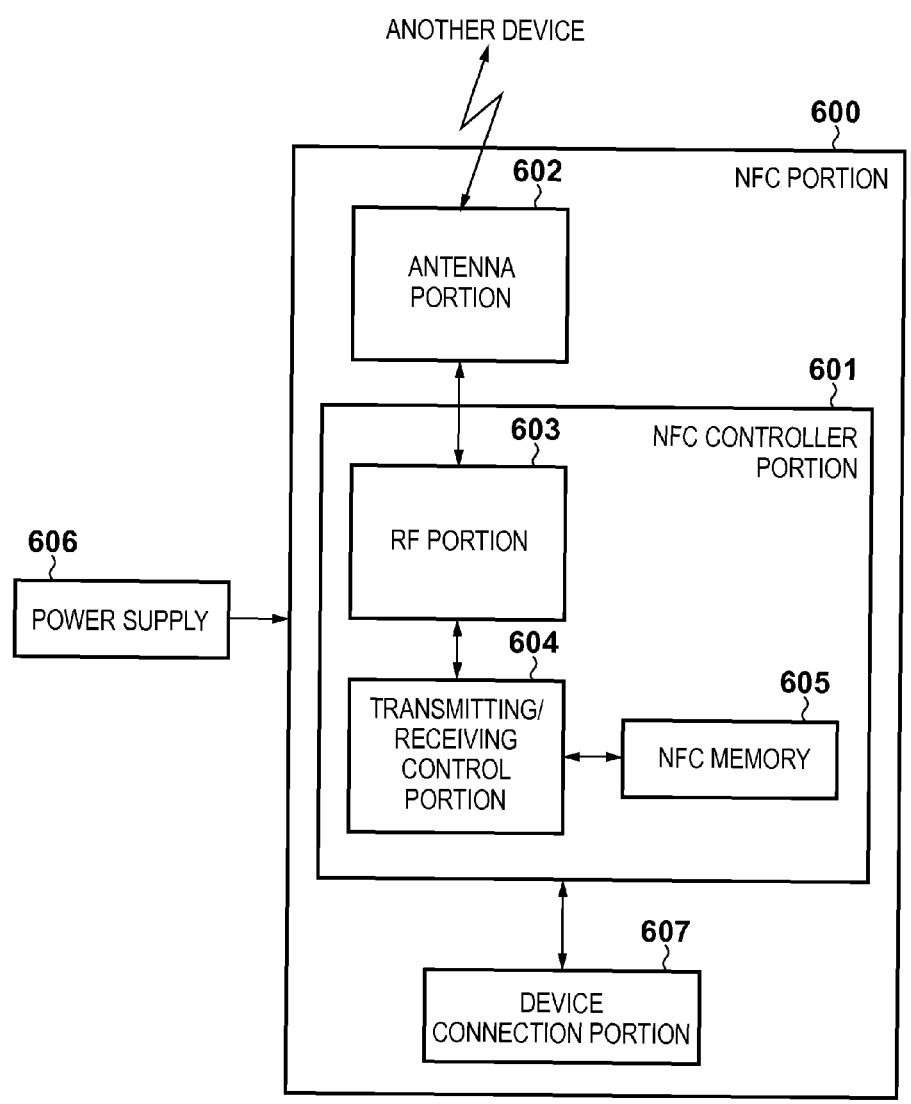
FIG. 6 is a block diagram showing the arrangement of an NFC portion.

FIG. 6 is a block diagram showing details of an NFC portion 600 used as the NFC portion 201 or 306.

In NFC communication, when the NFC portion 600 is used to perform short distance wireless communication, an apparatus which outputs an RF (Radio Frequency) field to start communication is called an initiator. An apparatus which communicates with the initiator in response to an instruction issued by the initiator is called a target.

A passive mode and active mode will now be described. The communication mode of the NFC portion includes a passive mode and active mode. In the passive mode, the target responds to an instruction of the initiator by performing load modulation. It is, therefore, unnecessary to supply power to the target. On the other hand, in the active mode, the target responds to an instruction of the initiator by an RF field generated by the target itself. It is, therefore, necessary to supply power to the target. The active mode has as its feature the communication speed higher than that in the passive mode. Note that in the passive mode, the RF field generated by the initiator causes a current to flow through the coil of the target. The target can perform data communication using the current as power for data communication. Consequently, in the passive mode, even if a battery or AC power supply supplies no power to the target, the target can perform NFC communication with the initiator.

The NFC portion 600 includes an NFC controller portion 601, an antenna portion 602, an RF portion 603, a transmitting/receiving control portion 604, an NFC memory 605, a power supply 606, and a device connection portion 607. The antenna portion 602 receives radio waves and carriers from another NFC device, and transmits radio waves and carriers to another NFC device. The RF portion 603 has a function of modulating/demodulating an analog signal to a digital signal. The RF portion 603 includes a synthesizer, and controls bands and channels based on frequency assignment data by identifying the frequencies of the bands and channels.

Note that the NFC memory 605 is implemented by, for example, a nonvolatile memory. Even if a power supply supplies no power, it is possible to read out/write data from/in the NFC memory 605. More specifically, data stored in the NFC memory 605 can be read out/written by communication in the NFC passive mode, even if, for example, the remaining battery amount of the terminal apparatus 200 has run out or no power is supplied to the printing apparatus 300. The NFC controller portion 601 performs data storage control including an operation of reading out/writing data from/in the NFC memory 605.

The transmitting/receiving control portion 604 executes control associated with transmission/reception, such as assembling and disassembling of a transmission/reception frame, appending and detection of a preamble, and identification of a frame. The transmitting/receiving control portion 604 also controls the NFC memory 605 to read out/write various data and programs. When the NFC portion operates in the active mode, it receives power via the power supply 606 to communicate with a device via the device connection portion 607 and to communicate with another NFC device located within a communicable range by carriers transmitted/received via the antenna portion 602. When the NFC portion operates in the passive mode, it receives carriers from another NFC device via the antenna to receive power from the other NFC device by electromagnetic induction, and transmits/receives data by performing communication with the other NFC device by modulating carriers.

An operation of moving the NFC portion 201 of the terminal apparatus 200 and the NFC portion 306 of the printing apparatus 300 close to each other will be referred to as an "NFC touch operation" hereinafter.

In this embodiment, a use case will be described, in which the user selects an image to be printed by operating the terminal apparatus 200, and then performs an NFC touch operation for the printing apparatus 300 for executing printing, thereby printing the selected image by the printing apparatus 300.

The embodiment will be described with reference to a flowchart shown in FIG. 7.

Figure 7:
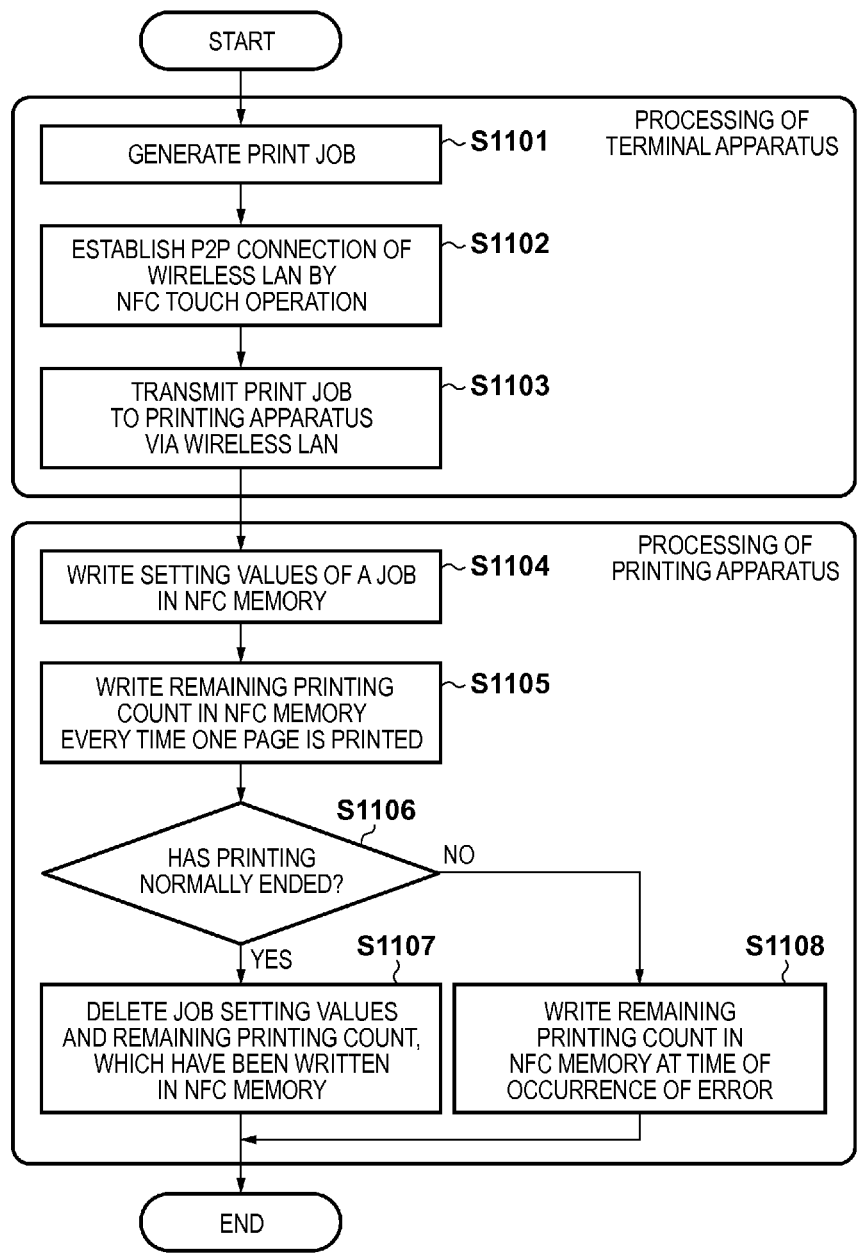
FIG. 7 is a flowchart illustrating processing according to the first embodiment.

Note that processing shown in FIG. 7 is executed by the CPU 211 of the terminal apparatus 200 and the CPU 311 of the printing apparatus 300. More specifically, programs for implementing the processing shown in FIG. 7 are stored in the program memory 213 of the terminal apparatus 200 and the program memory 313 of the printing apparatus 300. The CPUs 211 and 311 then execute the programs on the data memories 214 and 314, thereby implementing the processing shown in FIG. 7.

FIG. 7 shows the processing when the printing apparatus 300 prints an image designated by the terminal apparatus 200. FIG. 8 shows setting values of a job written in the NFC memory of the printing apparatus 300. The setting values of FIG. 8 show one embodiment of the present invention, and different information may be included or some of the setting values need not be included. FIG. 9 shows a remaining printing count written in the NFC memory of the printing apparatus 300.

In step S1101, the terminal apparatus 200 selects image data in response to an operation through the operation portion 204, and generates a print job by setting a printing count. At this time, a plurality of image data may be selected. In step S1102, the terminal apparatus 200 establishes a P2P connection of a wireless LAN with the printing apparatus 300 in response to an NFC touch operation. In step S1103, the terminal apparatus 200 transmits the job data generated in step S1101 to the printing apparatus 300.

In step S1104, the printing apparatus 300 writes setting values of a job (FIG. 8) from the received job data into the NFC memory of the printing apparatus 300. In step S1104, the printing apparatus 300 is executing printing. In step S1105, every time printing of one paper sheet is completed, the printing apparatus 300 writes and updates the remaining printing count (FIG. 9) in the NFC memory of the printing apparatus 300. When the remaining printing count of a managed image ID in FIG. 9 becomes 0, the remaining printing count of the image ID may be deleted from the NFC memory of the printing apparatus 300.

In step S1104, the printing apparatus 300 writes the setting values of a job (FIG. 8) from the received job data into the NFC memory of the printing apparatus 300. Note that when the job data is transmitted and received in steps S1103 and S1104, either the printing apparatus 300 or terminal apparatus 200 may operate as an initiator. That is, the NFC portion 306 of the printing apparatus 300 may serve as a target to receive the job data from the terminal apparatus 200 serving as an initiator, or the NFC portion 306 may serve as an initiator to read out the job data from the NFC memory of the terminal apparatus 200 serving as a target. When the NFC portion 306 of the printing apparatus 300 operates as an initiator, it transits to a target upon completion of reception of the job data.

In step S1106, the printing apparatus 300 determines whether printing has normally ended. If printing has normally ended (YES in step S1106), in step S1107 the printing apparatus 300 deletes the setting values of the job and remaining printing count, which have been written in the NFC memory of the printing apparatus 300. On the other hand, if printing has not ended normally due to an error or the like (NO in step S1106), in step S1108 the printing apparatus 300 writes and updates the remaining printing count in the NFC memory of the printing apparatus 300. The remaining printing count may be written in the NFC memory at the time of occurrence of an error during the printing processing (a series of processes for each page).

Note that the error indicates an error from which printing by the printing apparatus 300 cannot immediately recover, for example, a malfunction of the printing portion and a failure of the printing apparatus 300 (power supply failure, part failure, and the like). However, the error is not limited to them, and may indicate any error which disables printing from normally ending, for example, a case in which a paper sheet is jammed in the printing apparatus 300, and a case in which paper or printing material such as ink runs out in the printing apparatus 300.

As described above, according to the processing shown in FIG. 7, in steps S1104, S1105, and S1108, the setting values to be used for printing and the remaining printing count in a print job are written in the NFC memory. Even if, therefore, printing is interrupted by an error, the communication terminal including the NFC portion can read out the setting values and remaining printing count from the NFC memory of the printing apparatus 300. As a result, it is possible to cause a printing apparatus different from the printing apparatus 300 to continue the printing operation in the printing apparatus 300 by setting the readout setting values and remaining printing count, and transmitting a print job to the different printing apparatus.

As described above, when the NFC portion 306 of the printing apparatus 300 operates as an initiator, it transits to a target upon completion of reception of job data. Furthermore, as described above, the NFC portion serving as a target can perform NFC communication in the passive mode even if a battery or AC power supply supplies no power to the NFC portion. Even if, therefore, printing is interrupted when an error which hinders the battery or AC power supply from supplying power to the printing apparatus 300 occurs, the communication terminal can confirm the setting values and remaining printing count, which have been used in the interrupted printing operation.

Note that the condition under which the NFC portion 306 transits to a target is not limited to completion of reception of job data. For example, when an error occurs, the NFC portion 306 may transit to a target, or when power supply to the printing apparatus 300 stops, the NFC portion 306 may automatically transit to a target.

When an error occurs, the NFC portion 306 of the printing apparatus 300 may operate as an initiator instead of transiting to a target. For example, when a paper sheet is jammed in the printing apparatus 300 or printing is interrupted because paper or ink has run out, power is continuously supplied to the printing apparatus 300. It is, therefore, possible to cause the NFC portion 306 to operate as an initiator, thereby notifying the communication terminal of the setting values and remaining printing count in the NFC memory.

As described above, according to the first embodiment, even if the printing apparatus 300 cannot continue printing due to a failure or the like, it saves, in the NFC memory, the setting values of the job and remaining printing count, which have been used for the printing operation. This enables the terminal apparatus 200 to continue the printing operation using a printing apparatus different from the printing apparatus 300 by referring to the setting values of the job and remaining printing count, which have been saved in the NFC memory of the printing apparatus 300.

Second Embodiment

In this embodiment, a use case in which a printing apparatus 700 (alternate printing apparatus) performs printing using setting values of a job shown in FIG. 8 and saved in the NFC memory of a printing apparatus 300 will be described. The printing apparatuses 300 and 700 may be the same or different.

Note that the arrangement of each apparatus according to this embodiment is the same as that described in the first embodiment and a description thereof will be omitted, unless otherwise specified. The printing apparatus 700 has the same outer appearance as that shown in FIGS. 3A and 3B, and the same arrangement as that shown in FIG. 5.

Figure 10:
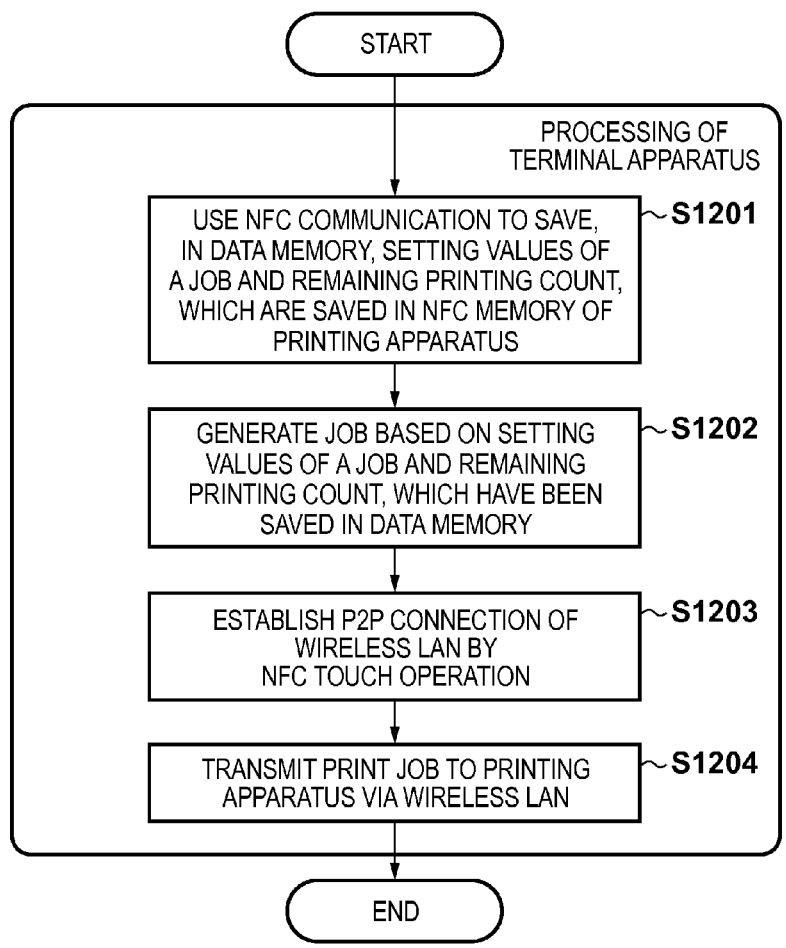
FIG. 10 is a flowchart illustrating processing according to the second embodiment.

The embodiment will be described with reference to a flowchart shown in FIG. 10. FIG. 10 shows processing of copying the setting values of a job (FIG. 8) saved in the NFC memory of the printing apparatus 300 in a terminal apparatus 200, generating a job using the setting values of the job, and performing printing in the printing apparatus 700.

In step S1201, the terminal apparatus 200 uses NFC communication to read out the setting values of the job (FIG. 8) and the remaining printing count (FIG. 9), which are saved in the NFC memory of the printing apparatus 300. The terminal apparatus 200 saves the readout setting values of the job and remaining printing count in a data memory 214.

In step S1202, the terminal apparatus 200 generates a job based on the setting values of the job and remaining printing count, which have been saved in the data memory 214. In step S1203, the terminal apparatus 200 establishes a P2P connection of a wireless LAN with the printing apparatus 700 in response to an NFC touch operation. The terminal apparatus 200 and printing apparatus 700 can establish a wireless LAN connection irrespective of the network arrangement of the printing apparatus 300. In step S1204, the terminal apparatus 200 transmits the job generated based on the setting values of the job and remaining printing count to the printing apparatus 700 via the wireless LAN.

As described above, according to the second embodiment, even if the printing apparatus 300 cannot continue printing due to a failure or the like, it is possible to continue the printing operation using the alternate printing apparatus 700 by referring to the setting values of the job and remaining printing count, which are saved in the NFC memory of the printing apparatus 300.

Third Embodiment

In this embodiment, the following use case will be described. That is, the user selects an image to be printed by operating a terminal apparatus 200, and then performs an NFC touch operation for a printing apparatus 300 for executing printing, thereby printing the selected image by the printing apparatus 300. After that, when the printing apparatus 300 cannot continue printing, a printing apparatus 700 different from the printing apparatus 300 performs printing using setting values of the job (FIG. 8) saved in the NFC memory of the printing apparatus 300.

Note that the arrangement of each apparatus according to this embodiment is the same as that described in the first or second embodiment and a description thereof will be omitted, unless otherwise specified.

Figure 11:
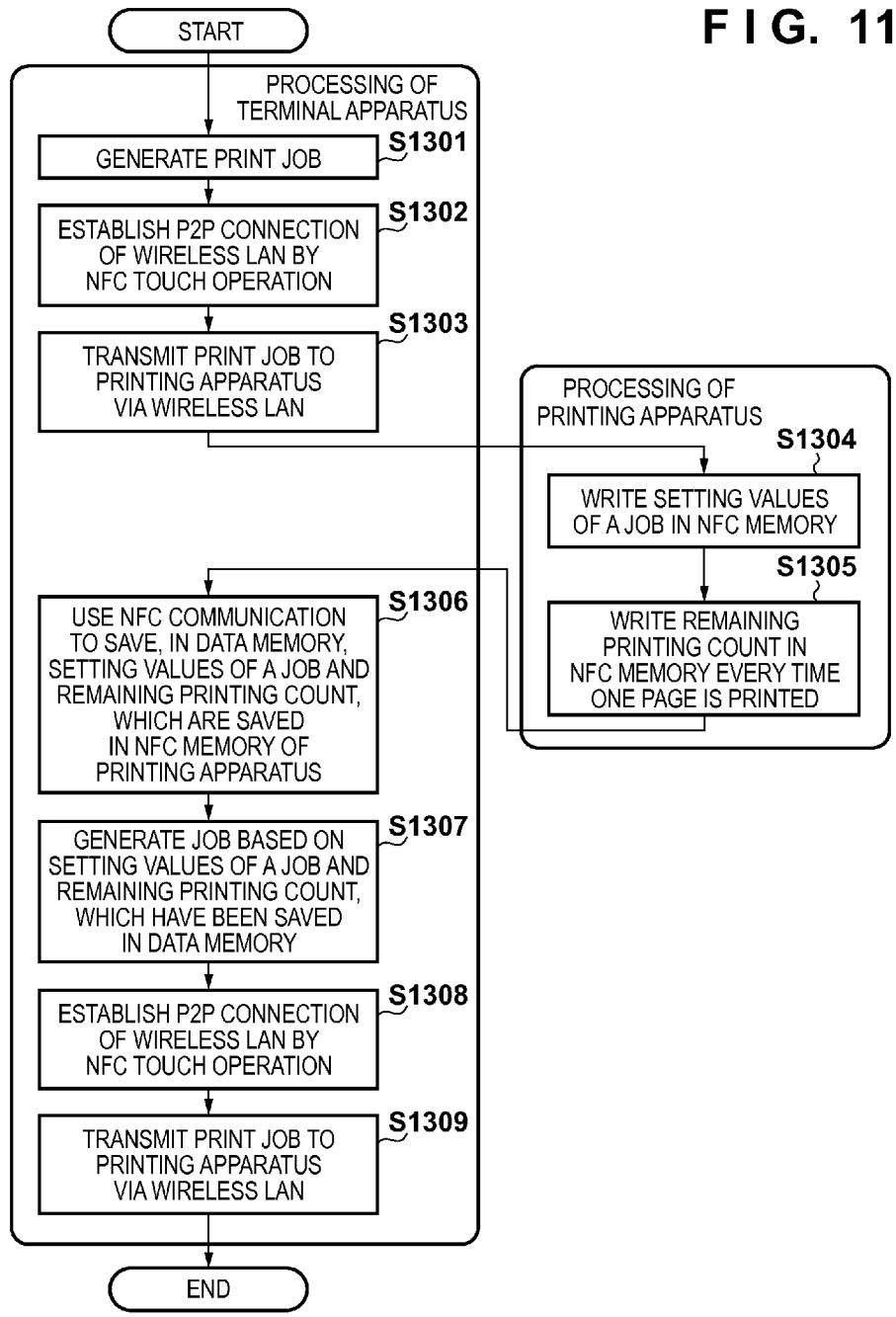
FIG. 11 is a flowchart illustrating processing according to the third embodiment.

The embodiment will be described with reference to a flowchart shown in FIG. 11. FIG. 11 shows processing of transmitting a job from the terminal apparatus 200 to the printing apparatus 300, regenerating, when the printing apparatus 300 fails, a job using the setting values of the job saved in the NFC memory of the printing apparatus 300, and transmitting the regenerated job to the printing apparatus 700.

In step S1301, the terminal apparatus 200 selects image data in response to an operation through an operation portion 204, and generates a print job by setting a printing count. At this time, a plurality of image data may be selected. In step S1302, the terminal apparatus 200 establishes a P2P connection of a wireless LAN with the printing apparatus 300 in response to an NFC touch operation. In step S1303, the terminal apparatus 200 transmits the job data generated in step S1301 to the printing apparatus 300.

In step S1304, the printing apparatus 300 writes setting values of a job (FIG. 8) in the NFC memory of the printing apparatus 300. In step S1304, the printing apparatus 300 is executing printing. In step S1305, every time printing of one paper sheet is completed, the printing apparatus 300 writes and updates the remaining printing count (FIG. 9) in the NFC memory of the printing apparatus 300. When the remaining printing count of a managed image ID in FIG. 9 becomes 0, the remaining printing count of the image ID may be deleted from the NFC memory of the printing apparatus 300.

Assume that a failure which disables the printing apparatus 300 from being powered on occurs immediately before step S1306.

In step S1306, the terminal apparatus 200 uses NFC communication to read out the setting values of the job (FIG. 8) and remaining printing count (FIG. 9), which are saved in the NFC memory of the printing apparatus 300. Even if the printing apparatus 300 cannot be powered on due to a failure, it is possible to read out the information saved in the NFC memory using the NFC passive mode. The terminal apparatus 200 saves the readout setting values of a job and remaining printing count in a data memory 214.

In step S1307, the terminal apparatus 200 generates a job based on the setting values of the job and the remaining printing count, which have been saved in the data memory 214. In step S1308, the terminal apparatus 200 establishes a P2P connection of a wireless LAN with the printing apparatus 700 in response to an NFC touch operation. The terminal apparatus 200 and printing apparatus 700 can establish a wireless LAN connection irrespective of the network arrangement of the printing apparatus 300. In step S1309, the terminal apparatus 200 transmits the job generated based on the setting values of the job and remaining printing count to the printing apparatus 700 via the wireless LAN.

As described above, according to the third embodiment, even if the printing apparatus 300 cannot continue printing due to a failure or the like, it is possible to continue printing using the alternate printing apparatus 700 different from the printing apparatus 300 by referring to the setting values of the job and remaining printing count, which are saved in the NFC memory of the printing apparatus 300.

Fourth Embodiment

In this embodiment, the following use case will be described. That is, the user selects an image to be printed by operating a terminal apparatus 200, and then performs an NFC touch operation for a printing apparatus 300 for executing printing, thereby printing the selected image by the printing apparatus 300. After that, when the printing apparatus 300 cannot continue printing, job setting values of a job (FIG. 8) saved in the NFC memory of the printing apparatus 300 are saved in the terminal apparatus 200. The saved setting values of the job are converted into information which absorbs differences between the firmware version of the printing apparatus 300 and that of a printing apparatus 700 different from the printing apparatus 300. The firmware is software (a control program) embedded in a device for executing basic control (operation) of hardware, and is stored in, for example, a program memory 313.

Note that the arrangement of each apparatus according to this embodiment is the same as that described in the first, second, or third embodiment and a description thereof will be omitted, unless otherwise specified.

Figure 12:
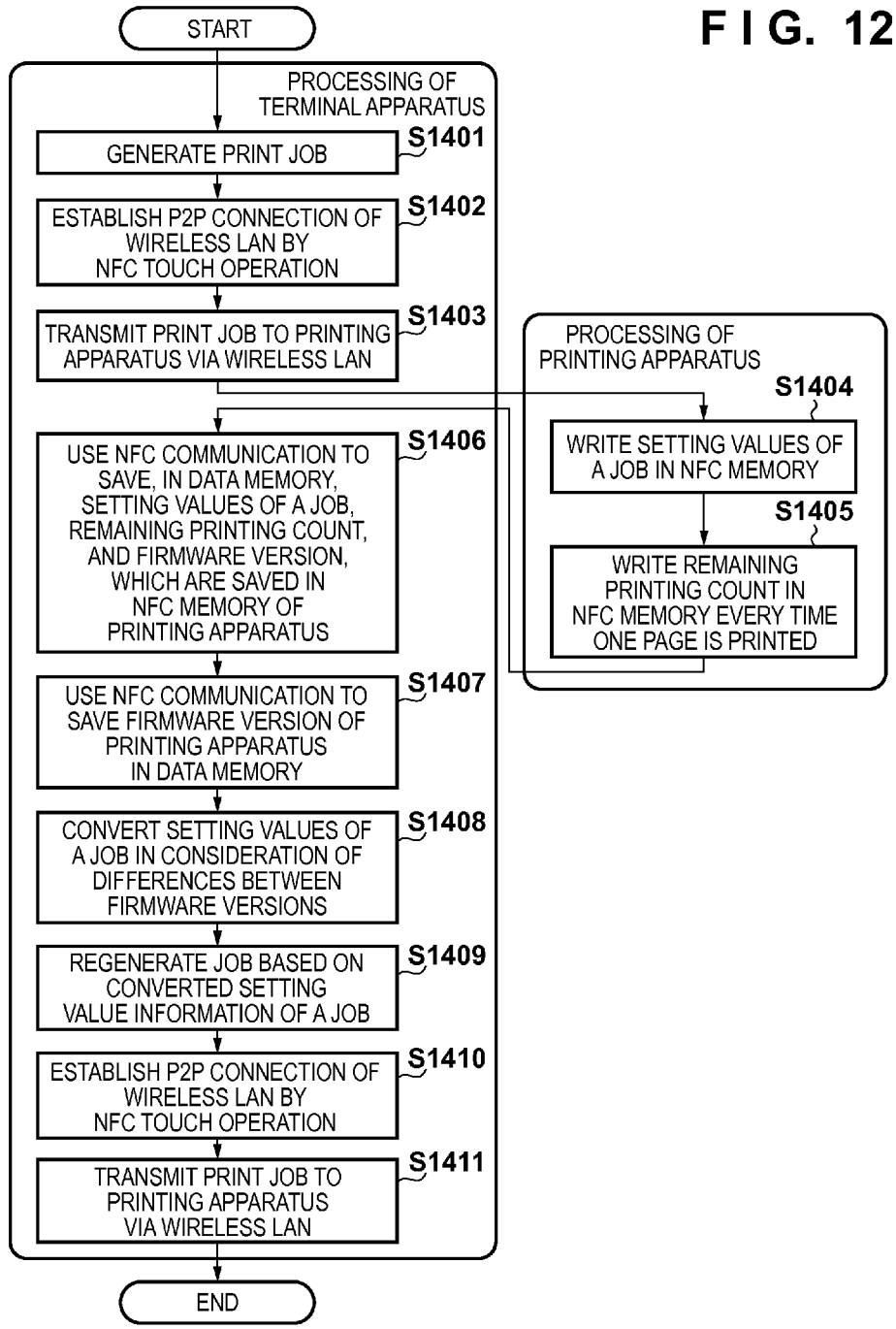
FIG. 12 is a flowchart illustrating processing according to the fourth embodiment.

The embodiment will be described with reference to a flowchart shown in FIG. 12. FIG. 12 shows processing of transmitting a job from the terminal apparatus 200 to the printing apparatus 300, reading out, when the printing apparatus 300 fails, setting values of a job saved in the NFC memory of the printing apparatus 300, converting the readout setting values of the job into a format which absorbs differences between the firmware versions of the printing apparatuses 300 and 700, and regenerating a job.

Note that processes in steps S1401 to S1405 are the same as those in step S1301 to S1305 of FIG. 11 and a description thereof will be omitted. Note that in step S1404 or S1405, the printing apparatus 300 stores, in the NFC memory, a firmware version (version information) indicating the version of firmware stored in a program memory 213.

Furthermore, processes in steps S1410 and S1411 are the same as those in steps S1308 and S1309 of FIG. 11 and a description thereof will be omitted. FIG. 13 is a table showing a conversion result obtained by converting the setting values of the job into a format which absorbs differences between the firmware versions of the printing apparatuses 300 and 700. The conversion result of FIG. 13 shows one embodiment of the present invention, and a different result may be obtained.

Assume that a failure which disables the printing apparatus 300 from being powered on occurs immediately before step S1406. In step S1406, the terminal apparatus 200 uses NFC communication to read out the setting values of the job (FIG. 8), the remaining printing count (FIG. 9), and the firmware version of the printing apparatus 300, which are saved in the NFC memory of the printing apparatus 300. Even if the printing apparatus 300 cannot be powered on due to a failure, it is possible to read out the information saved in the NFC memory using the NFC passive mode. The terminal apparatus 200 saves the readout setting values of the job, remaining printing count, and firmware version of the printing apparatus 300 in a data memory 214.

In step S1407, the terminal apparatus 200 uses NFC communication to read out the firmware version of the printing apparatus 700. In step S1408, as shown in FIG. 13, the terminal apparatus 200 converts the setting values of the job into a format which absorbs differences between the firmware versions of the printing apparatuses 300 and 700. In step S1409, the terminal apparatus 200 regenerates a job based on the converted setting values of the job.

As described above, according to the fourth embodiment, when the printing apparatus 300 cannot continue printing due to a failure or the like, even if there are differences between the firmware versions of the printing apparatuses 300 and 700, it is possible to continue printing using the alternate printing apparatus 700 different from the printing apparatus 300.

Fifth Embodiment

In this embodiment, the following use case will be described. That is, the user selects an image to be printed by operating a terminal apparatus 200, and then performs an NFC touch operation for a printing apparatus 300 for executing printing, thereby printing the selected image by the printing apparatus 300. After that, when the printing apparatus 300 cannot continue printing, setting values of a job (FIG. 8) saved in the NFC memory of the printing apparatus 300 are saved in the terminal apparatus 200. When it is impossible to absorb differences between the firmware version of the printing apparatus 300 and that of a printing apparatus 700 different from the printing apparatus 300 with respect to the saved setting values of the job, an error is displayed on the terminal apparatus 200.

Note that the arrangement of each apparatus according to this embodiment is the same as that described in the first, second, third, or fourth embodiment and a description thereof will be omitted, unless otherwise specified.

Figure 14:
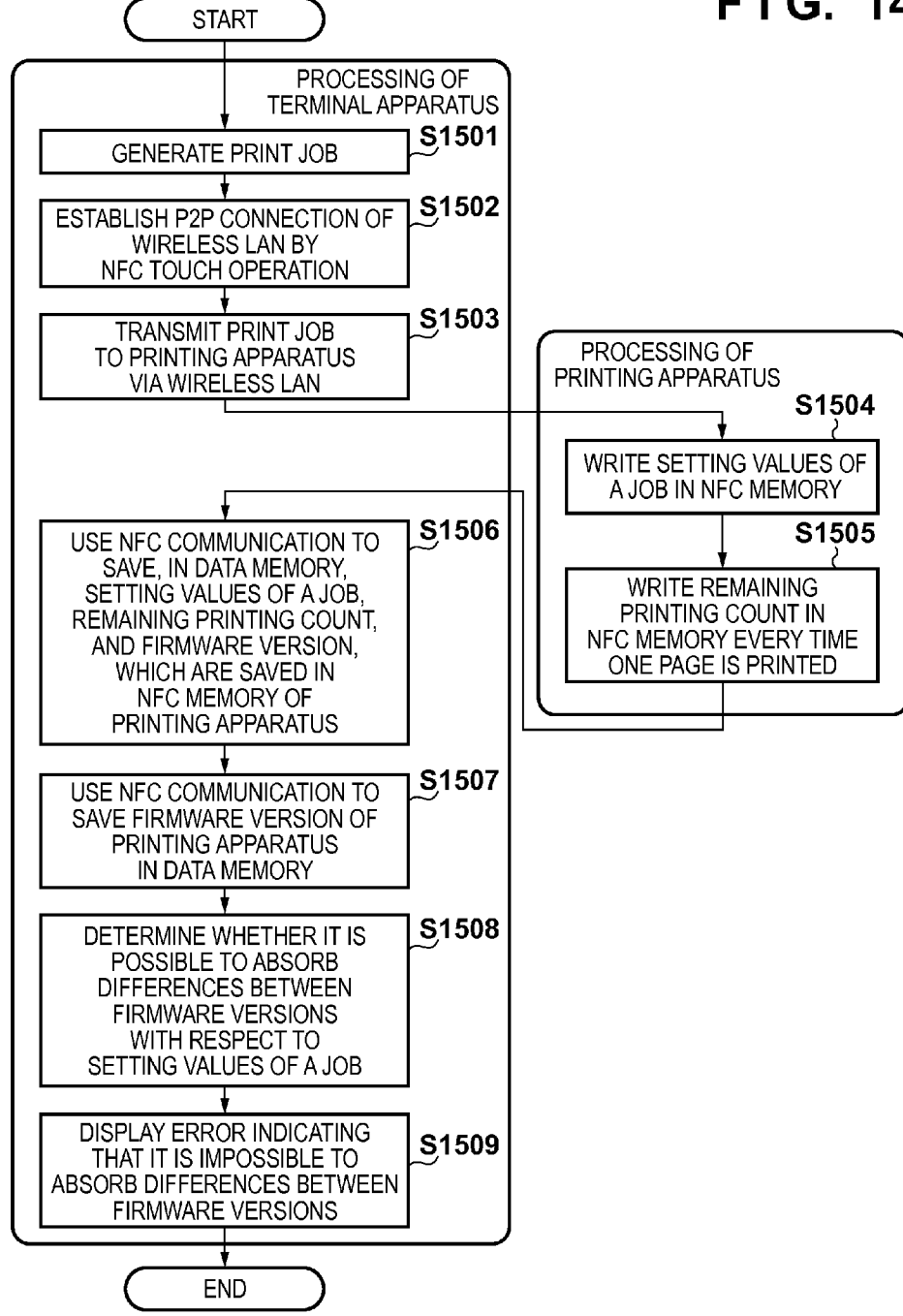
FIG. 14 is a flowchart illustrating processing according to the fifth embodiment.

The embodiment will be described with reference to a flowchart shown in FIG. 14. FIG. 14 shows processing of transmitting a job from the terminal apparatus 200 to the printing apparatus 300, reading out, when the printing apparatus 300 fails, job setting values of a job saved in the NFC memory of the printing apparatus 300, and displaying, when it is impossible to absorb differences between the firmware versions of the printing apparatuses 300 and 700 with respect to the readout setting values of the job, an error on the terminal apparatus.

Note that processes in steps S1501 to S1507 are the same as those in steps S1401 to S1407 of FIG. 12 and a description thereof will be omitted.

In step S1508, the terminal apparatus 200 determines whether it is possible to absorb differences between the firmware versions of the printing apparatuses 300 and 700 with respect to the setting values of the job read out from the NFC memory of the printing apparatus 300. If it is determined in step S1508 that it is impossible to absorb the differences between the firmware versions, that is, if it is determined that it is impossible to convert the setting values of the job so as to absorb the differences, in step S1509 the terminal apparatus 200 displays an error (error information) indicating it on a display portion 203.

Note that if it is determined in step S1508 that it is possible to absorb the differences between the firmware versions, the processes in step S1408 and subsequent steps of FIG. 12 of the fourth embodiment can be executed.

In this embodiment, when it is impossible to absorb the differences between the firmware versions, an error indicating it is displayed. The present invention, however, is not limited to this. For example, in addition to displaying the error, a confirmation screen for causing the printing apparatus 700 to temporarily perform printing may be displayed to cause the alternate printing apparatus to continue printing.

As described above, according to the fifth embodiment, in addition to the effects described in the fourth embodiment, when the alternate printing apparatus cannot perform printing, it is possible to notify the user of it.

Sixth Embodiment

In the above embodiments, when a print job is processed for each page using the printing function of the printing apparatus 300, every time the processing for each page is completed, the remaining printing count is stored in the NFC memory as progress information of the remaining processing. The present invention, however, is not limited to this.

Even when, for example, the FAX function of a printing apparatus 300 is used, the above embodiments are applicable. That is, when a FAX job is processed for each page using the FAX function of the printing apparatus 300, it is possible to store a remaining transmission count in an NFC memory as progress information of the remaining processing every time the processing for each page is completed, while storing setting values of a job in the NFC memory upon receiving the job. With this processing, even if the printing apparatus 300 cannot continue printing due to a failure or the like, it is possible to cause an alternate printing apparatus 700 to continue FAX transmission by referring to the setting values of the job and remaining transmission count, which are stored in the NFC memory of the printing apparatus 300. Alternatively, it is possible to re-execute FAX transmission from the beginning by referring to only the setting values.

Similarly, when the scanning function of the printing apparatus 300 is used, the above embodiments are also applicable. That is, when a scanning (scan) job is processed for each page using the scanning function of the printing apparatus 300, it is possible to store a remaining reading count in the NFC memory as progress information of the remaining processing every time the processing for each page is completed, while storing setting values of a job in the NFC memory. With this processing, even if the printing apparatus 300 cannot continue printing due to a failure or the like, the alternate printing apparatus 700 can continue scanning by referring to the setting values of the job and remaining reading count, which are stored in the NFC memory of the printing apparatus 300. Alternatively, it is possible to re-execute scanning from the beginning by referring to only the setting values.

As described above, when a function of the printing apparatus is used at a predetermined timing (for each a unit of processing (for example, each a unit of page)), progress information of the remaining processing (unprocessed processing) is stored in the NFC memory every time the processing for each a predetermined unit of processing among a series of processes by the job is completed, while storing setting values of a job (setting values corresponding to predetermined processing) in the NFC memory upon receiving a job for using the function. At this time, it is also possible to store, in the NFC memory, unique information such as a firmware version stored in a memory such as a program memory 313 for controlling the printing apparatus.

With this processing, even if the function of a printing apparatus currently used cannot be used and processing is interrupted (processing cannot be completed), it is possible to continue the interrupted processing using an alternate printing apparatus by referring to the data stored in the NFC memory.

In the above embodiment, a case has been described, in which an external apparatus as a job transmission destination reads out setting values in printing and progress information indicating the progress of printing from the NFC memory of a printing apparatus, and causes another printing apparatus to execute subsequent processing based on the setting values. The present invention, however, is not limited to this. In a printing apparatus in which printing has been interrupted, after an error or failure of the printing apparatus is solved, the printing apparatus may be caused to execute printing again based on the setting values and progress information, which have been read out from the NFC memory.

In the above embodiments, printing by a printing apparatus has been exemplified as predetermined processing executed by a job. The present invention, however, is not limited to this. For example, the contents described in this embodiment are applicable to various processes such as data transmission by the communication apparatus.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiments of the present invention, and by a method performed by the computer of the system or apparatus by, for example, reading out and executing the computer executable instructions from the storage medium to perform the functions of one or more of the above-described embodiments. The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-137481, filed Jun. 28, 2013, which is hereby incorporated by reference herein in its entirety.

What is claimed is:

1. A system, comprising:
a communication device configured to perform a short distance wireless communication; and
a processing apparatus configured to receive a job from the communication device after the short distance wireless communication is performed, and to execute predetermined processing based on the job,
wherein said processing apparatus stores progress information indicating progress of the predetermined processing in the job, in a nonvolatile memory from which said communication device is capable of reading out the progress information by performing the short distance wireless communication,
and wherein in a case where an error occurs in the predetermined processing, said communication device performs an operation for executing unexecuted processing in the job, based on the progress information read from the nonvolatile memory, and in a case where the error does not occur, said communication device does not perform the operation.

2. The system according to claim 1, wherein said processing apparatus stores, in said nonvolatile memory, a setting value used to the predetermined processing with the progress information.

3. The system according to claim 2, wherein said communication device reads out, from the memory of the external apparatus, the setting value and the progress information, and transmits, to the external apparatus, a new job for executing unprocessed processing based on the progress information.

4. The system according to claim 3, wherein said communication device reads, from the memory, first version information indicating a version of a control program for controlling an operation of the processing apparatus, and in a case where the first version information is different from second version information indicating a version of a control program for controlling an operation of the processing apparatus as a job transmission destination, converts the setting value of the job for the unprocessed processing so as to absorb the difference.

5. The system according to claim 4, wherein the communication device comprising
a display unit configured to display, when the first version information is different from the second version information and it is impossible to convert the setting value of the job for the unprocessed processing so as to absorb the difference, error information indicating that the first version information is different from the second version information and it is impossible to convert the setting value of the job for the unprocessed processing so as to absorb the difference.

6. The system according to claim 1, wherein said processing apparatus stores the progress information in said nonvolatile memory every time processing for each a predetermined unit is completed in the predetermined processing, and deletes the progress information in a case where the error does not occur and the predetermined processing is completed.

7. The system according to claim 1, wherein in a case where the error does not occur and the predetermined processing normally ends, said processing apparatus deletes the progress information corresponding to the predetermined processing from said nonvolatile memory.

8. The system according to claim 1, wherein in response to occurrence of the error in the predetermined processing, said processing apparatus stores the progress information in said nonvolatile memory.

9. The system according to claim 1, wherein said processing apparatus stores, in said nonvolatile memory, version information indicating a version of a control program for controlling an operation of said processing apparatus.

10. The system according to claim 1, wherein said processing apparatus receives the setting value from the communication device, and stores the received setting value in said nonvolatile memory.

11. The system according to claim 1,
wherein the communication device performs NFC communication as the short distance wireless communication.

12. The system according to claim 1, wherein the communication device performs the short distance wireless communication, and performs another wireless communication based on the short distance wireless communication,
and wherein the communication device transmits the job via the another wireless communication.

13. The system according to claim 1,
wherein the predetermined processing is transmission of data.

14. The system according to claim 1,
wherein the predetermined processing is fax transmission.

15. The system according to claim 1, wherein the nonvolatile memory is a memory from which said communication device is capable of reading out the progress information by the short distance wireless communication even if no power is supplied to said processing apparatus.

16. The system according to claim 1, wherein said communication device can cause another processing apparatus different from said processing apparatus, to execute unexecuted processing in the job.

17. A method which is executed by a communication device configured to perform a short distance wireless communication and a processing apparatus configured to receive a job from the communication device after the short distance wireless communication is performed, and to execute predetermined processing based on the job, the method comprising:

storing, by the processing apparatus, progress information indicating progess of the predetermined processing in the job, in a nonvolatile memory from which said communication device is capable of reading out the progress information by performing the short distance wireless communication, performing by the communication device, in a case where an error occurs in the predetermined processing, an operation for executing unexecuted processing in the job, based on the progress information read from the nonvolatile memory, wherein, in a case where the error does not occur, the operation is not performed by said communication device.

18. A non-transitory computer-readable storage medium storing a program for causing a computer to execute a control method according to claim 17.

\* \* \* \* \*